Patented June 16, 1931

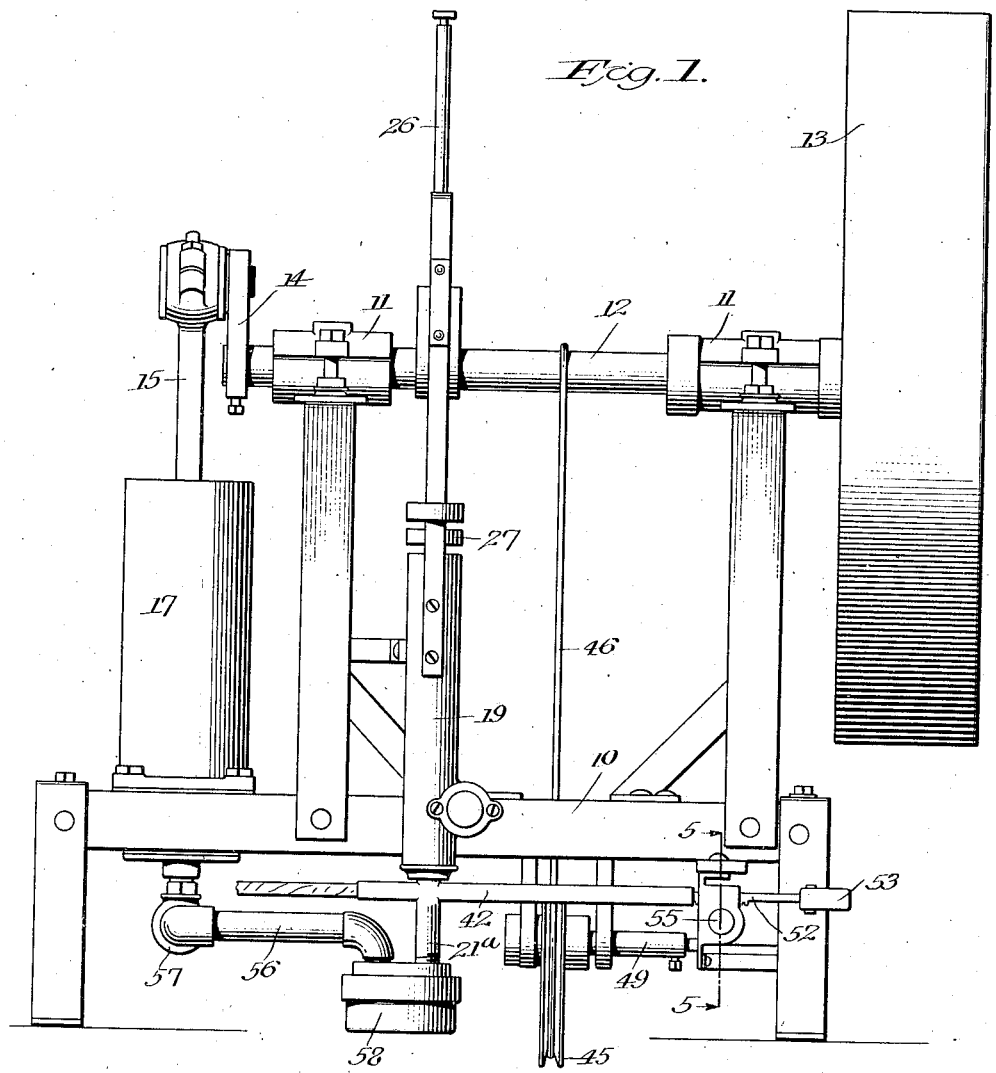

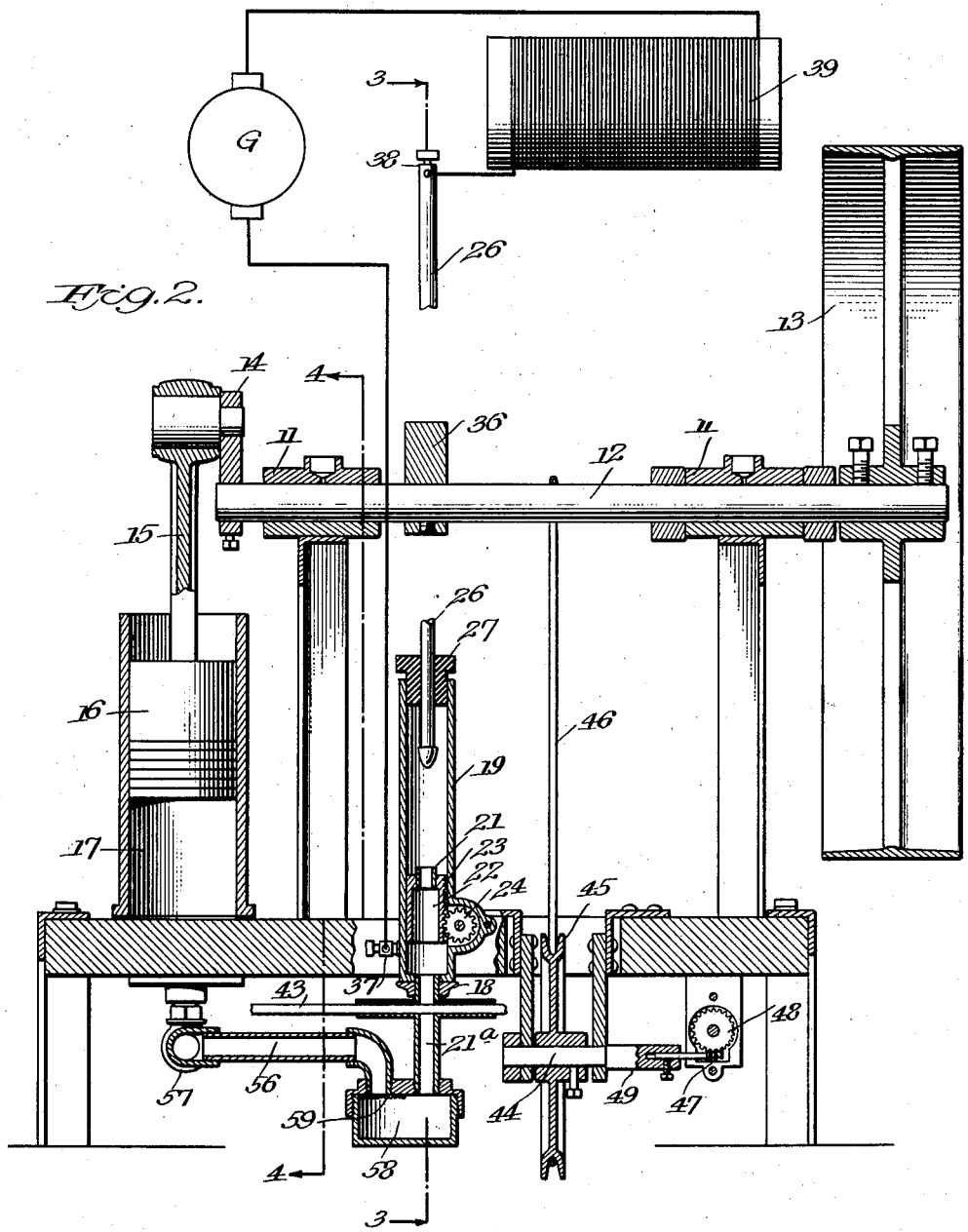

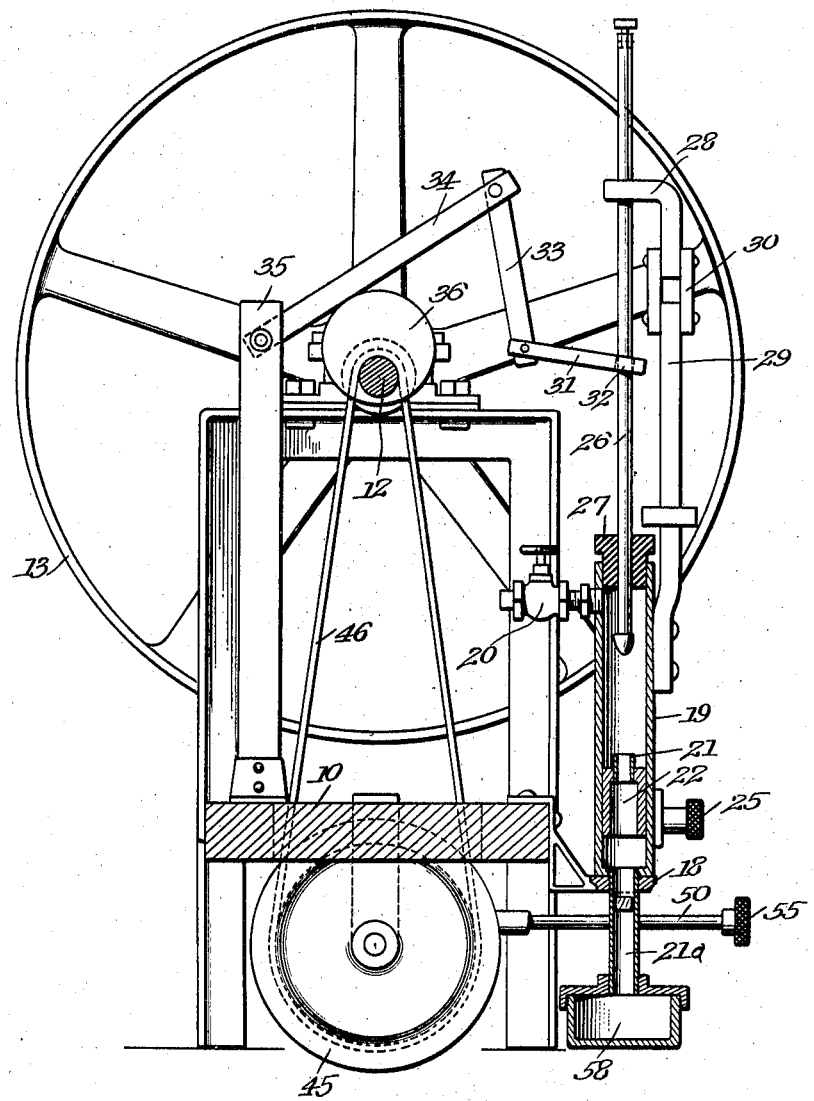

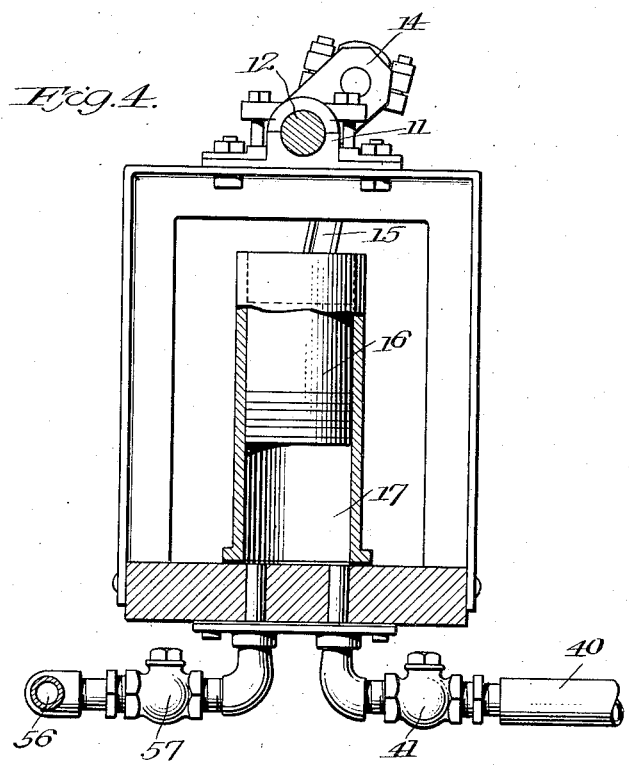
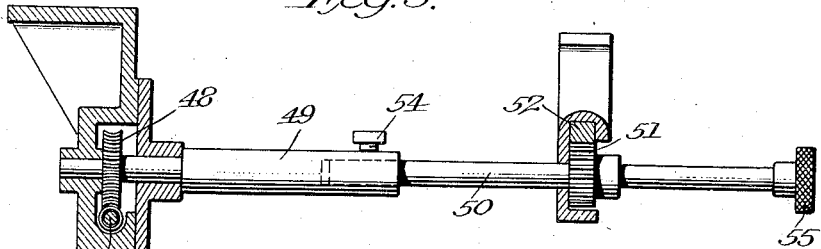
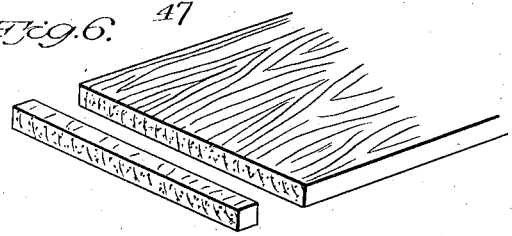

1,810,589

UNITED STATES PATENT OFFICE

JAMES N. ALSOP, OF CINCINNATI, OHIO, ASSIGNOR TO AMERICAN THERAPEUTIC GAS COMPANY, OF CINCINNATI, OHIO, A CORPORATION OF DELAWARE

GERMICIDAL GAS AND METHOD OF AND APPARATUS FOR PRODUCING THE SAME

Application filed October 7, 1925, Serial No. 61,042. Renewed December 15, 1928.

The present invention relates to a germicidal gas; an improved method of producing it, and new and useful apparatus for practicing the method.

In my Patents Nos. 1,060,410, dated April 29, 1913, and 1,219,527, dated March 20, 1917, I have disclosed, respectively a method of producing a preservative gas and the gas produced by that method.

That method, and the gas which results, are entirely satisfactory for many purposes, but I have discovered that the gas produced under that method is not satisfactory for therapeutics, and my present invention is designed to and has overcome the objections found with the gas as produced following the method disclosed in those earlier patents mentioned.

Under the method there disclosed, and using the apparatus by which the method was carried out, the organic substance (preferably wood) was entirely consumed, and all of its constituents liberated. Some of the elements released by this complete consumption or combustion are deleterious in medical work, and I have now discovered that the most beneficial effects result from the use of a gas containing only the more volatile constituents of the organic substance, and that these can be liberated and extracted following the method which will now be disclosed, and the distillation of the elements so controlled that only the desirable volatiles will be produced, eliminating the possibility of producing any gas which will have commingled with it elements which are undesirable in therapeutics.

I do this as distinguished from my earlier patents, by practicing a method and using an apparatus which eliminates any possibility of complete consumption of the organic substance, thus eliminating the objections which have been mentioned where complete consumption or combustion takes place.

The gas which I have now produced has, in practice, been used with marked success in the treatment of incised wounds, and tissue which has broken down as the result of disease, the result of application of this gas being to not only thoroughly sterilize and prevent infection, but also to prevent any inflammation or suppuration of the injured or diseased areas.

In order that the invention may be clear to those skilled in the art, I have shown, in the accompanying drawings, and shall describe in the following specification, the invention, and manner of practicing it, this disclosure being a complete disclosure of my present knowledge and understanding of the invention. It will be understood, however, that I am not to be bound by my present statement of my understanding of the actions and reactions in producing the gas, or my theory of its germicidal properties. Furthermore, while I have shown an apparatus which satisfactorily carries out the method, since it is obvious that other equally efficient devices may be developed, the disclosure is to be taken as illustrative, and in no sense restrictive of the invention.

In the drawings which form a part of this case—

Figure 1 is a view in elevation of an apparatus capable of performing the method and producing the gas.

Figure 2 is a sectional view of the apparatus shown in Figure 1 to show interior constructions.

Figure 3 is a sectional view of the apparatus substantially on the line 3—3 of Figure 2, looking in the direction of the arrow.

Figure 4 is a sectional view substantially on the line 4—4 of Figure 2, looking in the direction of the arrows.

Figure 5 is a detail of the feeding mechanism on line 5—5 of Fig. 1.

Figure 6 is a conventional view showing the preferred manner of cutting the wood, where wood is the organic substance used.

Referring to the drawings by numbers, like numbers indicating like parts in the several views, 10 indicates the frame of the machine which may be of any suitable construction. Mounted upon the frame are bearings 11, two being here shown, upon which bearings is mounted a shaft 12 provided with any suitable driving means, as, for example, the pulley 13. The said shaft 12 is provided with a crank arm 14 suitably connected with the pitman 15 of a pump piston 16, which piston reciprocates in a cylinder 17. Any suitable pump, or its equivalent, may be used, and I do not confine myself to the particular suction and impelling device shown.

Suitably mounted upon the frame 10 of the machine, as, for example, and, as here shown, by the supporting bracket 18, is a chamber 19 which is here shown in the form of a tube, and which preferably will be made or lined with any refractory material capable of withstanding high temperature. This chamber is preferably closed, except for the valve controlled inlet 20, by which air may be admitted, and an outlet 21a through which the gases produced in the chamber may escape.

Within the chamber I mount electrodes, the lower electrode 21 being in the form of a tube mounted in a carrier 22, which is vertically adjustable in the tube through the medium of the rack 23 and the gear wheel 24, which may be manually manipulated by the knurled handle 25, which is connected with the spur wheel 24, this adjustment of the lower electrode being desirable in order to regulate the arc. The upper electrode 26 passes through an insulating bushing 27 in the top of the chamber 19, the upper end of the electrode being held by a suitable support 28 carried by a standard 29 suitably supported, and here shown as supported from the chamber 19, an insulating joint 30 coupling the support 28 and the standard 29.

In order to manipulate the upper electrode and intermittently draw and break the arc between the electrode 26 and the electrode 21, any suitable intermittently operating mechanism may be used. I have found the one here shown suitable, and it comprises the electrode clutch 31 having a suitable clutching aperture 32 to receive the electrode. Said clutch member 31 is pivotally connected with a link 33, which link, in turn, is pivotally connected with a lever 34 pivotally mounted on any suitable part of the machine, as, for example, the standard 35. The lever 34 rides upon a cam 36 mounted on the shaft 12, and as the shaft revolves, the cam 36 will give a rising and falling movement to the clutch mechanism just described, intermittently drawing and extinguishing the arc in the chamber 19.

The action of the arc on the atmospheric air admitted is such that its constituents are brought into combinations which give a partly ionized dilute, nitrous gas.

While I have shown apparatus intended, and I have successfully used this as an intermittent arc device, characterized by a succession of arcs, I do not limit myself to this, as the stable arc now known in electro-chemical work or other suitable flaming electric discharge may be used.

Current for the electrodes may be supplied from any suitable source, and in Figure 2 I have shown, conventionally, a generator with its leads connected, one with the lower electrode through the binding post 37, and the other with a suitable binding post 38 with the upper electrode 26. A self induction coil 39 is preferably provided in the circuit.

In practice, it has been found that a five hundred volt (500 v.) generator, with an amperage of from two to three amperes at the arc is suitable, with a three inch pump, having a stroke of four inches, and operating at approximately sixty (60) active strokes a minute. These dimensions and conditions will, of course, be varied, dependent upon the size of the apparatus desired, and the volume of gas to be produced.

The heated partly ionized air or hot electrified gases leave the chamber 19 by way of the hollow electrode 21, and its carrier 22, and the outlet 21a, which outlet 21a is connected by any suitable piping arrangement, as, for example, the suction pipe 56 with the pump cylinder, a suitable non-return check valve 57 being provided, as shown in Figure 4 of the drawings, so as to prevent return pressure on the expelling stroke of the pump through the pipe 56.

The hot partly ionized air, or electrified gases as they leave the chamber 19, are brought into contact with an organic substance, preferably resinous wood, and preferably white pine wood, as the resinous gums and oils of white pine are regarded as best suited for therapeutic purposes. This contact of the gas with the wood must be controlled so that there will be no actual burning or combustion, but a liberating of the more volatile constituents only of the wood, which is preferably effected by the heat of the gases.

This may be accomplished in numerous ways, and I have shown, in the apparatus here illustrated, one convenient way of doing this. A cross passage through the outlet 21a is provided by means of the tube 42, which traverses the passage 21a probably at right angles thereto, as shown, this tube being of a size to conveniently receive the organic substance, that is, the stick of white pine wood 43. With this construction, as best seen in Figure 2, the wood passes directly through the passage 21a, the proportions being such that passage 21a is not completely closed, so that the heated ionized air or heated electrified gases coming from the chamber 19 will impinge upon and flow around and past the organic substance 43, liberating and driving off the volatile constituents of the wood, but without any actual burning or combustion of the wood.

The stick 42 may be conveniently and automatically fed by the following mechanism. Mounted in suitable bearings carried by the frame is a pulley shaft 44, on which is mounted a pulley 45 driven in any suitable manner, as, for example, by belt 46, which engages the shaft 12. The pulley shaft is provided with a worm section 47, preferably removably and adjustably mounted upon the shaft 44, and said worm section engages a worm wheel 48 on a shaft 49. Mounted on the shaft 49, or preferably, as here shown, on a removable shaft section 50 detachably connected with the main worm wheel shaft 49, is a gear wheel 51 which meshes with a rack 52, which rack enters the cross tube 42 and serves as a pusher to feed the wood automatically through the tube. The speed of the parts will, of course, be regulated and timed to give the proper results, and, by providing the removable worm section 47 and the removable shaft section 50, the proportions of the driving parts and their timing may be very readily changed, without unduly dismantling the machine, and the speed of travel of the wood through the hot current of ionized air may be regulated. Preferably the rack bar 52 will have a weight 53 at its outer end, so that when it is fully extended at the beginning of the operation of pushing the wood through the apparatus, the rack 52 will be maintained in mesh with the gear wheel 51.

It will be observed, from Figure 5, that the shaft section 50 is held in the socket in the worm wheel shaft 49 by means of the set screw 54, and that the shaft section 50 is provided, at its outer end, with a knurled handle. By this arrangement, it is possible to manually actuate the pusher rack 52, for, by simply loosening the set screw 54, the shaft section 50, and the gear wheel 51, may be manually operated through the handle 55, and the movement of the wood controlled by the operator.

The pump has a suction and expelling stroke, and the suction stroke, as has been heretofore stated, draws the gas through the pipe 56 past the check valve 41. On the expelling stroke, the gas will be forced out through the pipe 40 and delivered for use. A non-return check valve 41 is provided in the pipe 40 to prevent any return through the pipe 40 on the suction stroke of the pump. The suction stroke of the piston draws air through the inlet 20, chamber 19, pipe 56 and check valve 57; the pressure stroke forces the mixture through the check valve 41 and pipe 40, from which it is delivered for use.

In order to guard against the possibility of any solid substances, such as wood fiber, or any other solid substance, which might be delivered to the outlet 21, passing to the delivery point for the gas, I preferably provide the catch basin 58 between the outlet 21 and the pipe 56, and it is preferable also to provide a screen 59 in the catch basin to cover the end of the pipe 56. This very effectively prevents any solid substances coming over and being delivered with the gas, which would, of course, be objectionable, particularly in the treatment of respiratory or other internal tracts.

I have discovered that the best results are obtainable when the wood, where wood is the organic substance used, is cut in a particular way, and, in Figure 6, there is disclosed more or less conventionally the manner of preparing the wood.

It is cut preferably across the grain, as shown, and the strip thus cut is fed in with the cut faces vertical. With the wood cut and fed in this manner, when the ionized products coming from the chamber 19 through the outlet passage 21a strike and envelop the wood, the volatile products can more readily escape, for, when they are liberated, they follow the grain of the wood, and have but a short distance to travel in opposite directions to be released, as they pass out at the ends of the grain on each side of the stick, as conventionally illustrated in Figure 6.

While this is the preferred manner of preparing and using the wood, and the best results are obtained when this is done, I do not, of course, limit myself to this specific method of preparing and using the wood, or other organic substances.

The gas which I have produced may be variously applied. It may be led from the delivery pipe of the pump through a suitable conducting pipe, or tube, and sprayed over the injured or affected parts, or it may be put into containers and the affected parts immersed in the container. For treatment of internal injuries or diseased tracts, it may, in the case of respiratory injuries, or troubles, be inhaled, or it may be conducted to the internal areas, either of the respiratory or other tracts, by means of any of the usual or special instruments which are used to deliver remedial agents internally.

Although the material from which the volatile constituents are obtained is designated throughout the specification and claims as wood, this term is used in a broad sense to cover any material having suitable properties substantially the equivalent of wood. As explained, the preferred characteristics are those which are found in fatty pine wood of the white or yellow type.

While I have shown a specific apparatus, and that the best now known to me, it is to be understood that obvious mechanical variations are to be regarded as within the range of my claims.

I claim:—

1. The new and improved method of producing a germicidal gas which consists in continuously supplying atmospheric air to the field of an electrical discharge, subjecting the atmospheric air to the action of a flaming discharge of electricity, continuously releasing the more volatile constituents of wood by the action of heat and without combustion, and commingling the resultant of the air so heated and said volatile constituents.

2. The new and improved method of producing a germicidal gas which consists in subjecting atmospheric air to the action of a flaming discharge of electricity and commingling with the air so heated the more volatile constituents of wood released by the action of heat of the resultant of the treated air and without combustion.

3. A new and improved method of producing a germicidal gas which consists in subjecting atmospheric air to the action of an electric arc, subjecting wood to the hot and electrified gases resulting from the action of the electric arc to liberate the more volatile constituents of the wood without combustion thereof and commingling the released volatile constituents and the electrified gases.

4. The new and improved method of producing a germicidal gas which consists in continuously providing a supply of atmospheric air, continuously subjecting the atmospheric air to the action of an electric arc, continuously passing the resultant hot electrified gases in proximity to wood to liberate the more volatile constituents of the wood without combustion thereof, continuously supplying fresh wood into the path of said gases and commingling such volatile constituents with the electrified gases.

5. The new and improved method of producing a germicidal gas, which consists in subjecting atmospheric air to the action of an electric arc in a closed chamber, withdrawing the resultant products from the point of treatment in a stream, passing wood through the stream to liberate the more volatile constituents of such substance without combustion thereof, and commingling such released volatile constituents with the resultant products of the air.

6. In apparatus of the class described, the combination of a closed chamber having an air inlet and an outlet, a pair of electrodes in said chamber, means for supplying an electric current to said electrodes to form an arc, means for withdrawing through the outlet of said chamber the resultant products of atmospheric air, and means for feeding wood through the stream of products withdrawn from said chamber to liberate the more volatile constituents thereof without combustion of such substance.

7. In apparatus of the class described, the combination of a closed chamber having an air inlet and an outlet, a pair of electrodes in said chamber, means for supplying an electric current to said electrodes to form an arc, means for withdrawing through the outlet of said chamber the resultant products of atmospheric air, and means for automatically feeding an organic substance through the stream of products withdrawn from said chamber to liberate the more volatile constituents thereof without combustion of such substance.

8. In an apparatus of the class described, the combination of a pair of electrodes, means for supplying electric current to said electrodes to form an arc, a conduit for the resultant products of the atmospheric air, means for drawing the products through said conduit, means for introducing an organic substance in said conduit, and subjecting it to the action of the products passing through the conduit without combustion of said substance, and a screen in said conduit to prevent solids passing through said conduit.

9. In an apparatus of the class described, the combination of a pair of electrodes, means for supplying electric current to said electrodes to form an arc, a conduit for the resultant products of the atmospheric air, means for drawing the products through said conduit, means for introducing an organic substance in said conduit and subjecting it to the action of the products passing through the conduit without combustion of said substance, and a screen and catch basin to collect and retain any solids passing through said conduit.

In testimony whereof I have hereunto set my hand.

JAMES N. ALSOP.